(12) United States Patent
Park et al.

(10) Patent No.: US 11,788,162 B2
(45) Date of Patent: Oct. 17, 2023

(54) MANUFACTURING METHOD OF CAGE AND THE CAGE MANUFACTURED BY THE METHOD

(71) Applicants: Seohan Innobility Co., Ltd., Chungcheongbuk-do (KR); Korea Movenex Co., Ltd., Ulsan (KR)

(72) Inventors: Jeong Lyul Park, Hwaseong-si (KR); Won Kew Ban, Hwaseong-si (KR); Hyo Jin Kim, Hwaseong-si (KR)

(73) Assignees: SEOHAN INDUSTRY CO., LTD., Jincheon-gun (KR); KOREA FLANGE CO., LTD., Ulsan (KR)

( * ) Notice: Subject to any disclaimer, the term of this patent is extended or adjusted under 35 U.S.C. 154(b) by 118 days.

(21) Appl. No.: 17/401,343

(22) Filed: Aug. 13, 2021

(65) Prior Publication Data
US 2022/0056546 A1 Feb. 24, 2022

(30) Foreign Application Priority Data
Aug. 18, 2020 (KR) .......................... 10-2020-0103477

(51) Int. Cl.
*C21D 9/40* (2006.01)
*F16C 33/44* (2006.01)
*C21D 1/18* (2006.01)

(52) U.S. Cl.
CPC ................. *C21D 9/40* (2013.01); *C21D 1/18* (2013.01); *F16C 33/44* (2013.01)

(58) Field of Classification Search
CPC ...... C21D 9/40; C21D 1/18; C21D 2211/002; C21D 9/085; F16C 33/44;
(Continued)

(56) References Cited

U.S. PATENT DOCUMENTS 7,758,431 B2 7/2010 Cremerius et al.

FOREIGN PATENT DOCUMENTS

| JP | 2001082498 A | * | 3/2001 |
| JP | 2006-226412 A |   | 8/2006 |

(Continued)

OTHER PUBLICATIONS

KR100737602B1—Hyung machine translation (Year: 2007).*

*Primary Examiner* — Rebecca Janssen
(74) *Attorney, Agent, or Firm* — Park, Kim & Suh, LLC

(57) ABSTRACT

Disclosed are a method of manufacturing cage for a constant velocity joint and a cage for a constant velocity joint manufactured using the same for providing a cage having improved hardness, strength, and elongation while having a structure with a uniform core part and surface and for ensuring economic feasibility by reducing manufacturing time. The method includes a cutting operation of forming a structure having an outer shape by cutting a cylindrical pipe, forming an outer circumference of the cut structure to have a curved surface thereon, performing a turning operation on a surface of the formed structure, a punching operation of forming a window in the surface of the structure on which the turning operation is performed, a broaching operation of processing an edge of the window formed via punching, and a heat treatment operation of fully hardening the completely broached cage via austempering.

5 Claims, 14 Drawing Sheets

(58) Field of Classification Search
CPC ... F16D 2003/22303; F16D 2200/0021; F16D 2250/0007; F16D 2250/003; F16D 2250/0053; F16D 3/223; B23P 13/00; B23P 15/00; C22C 38/04
See application file for complete search history.

(56) References Cited

FOREIGN PATENT DOCUMENTS

| | | | |
|---|---|---|---|
| JP | 4731945 B2 | | 7/2011 |
| JP | 2020079630 A | * | 5/2020 |
| KR | 10-2007-0055423 A | | 5/2007 |
| KR | 10-0727196 B1 | | 6/2007 |
| KR | 10-0737602 | * | 7/2007 |
| KR | 10-0737602 B1 | | 7/2007 |
| WO | WO-2017050464 A1 | * | 3/2017 ............... C21D 1/06 |

* cited by examiner

CUTTING

FORMING

TURNING

PUNCHING

BROACHING

SURFACE

CORE PART

SURFACE

CORE PART

MANUFACTURING METHOD OF CAGE AND THE CAGE MANUFACTURED BY THE METHOD

CROSS-REFERENCE TO RELATED APPLICATIONS

This application claims the benefit of Korean Patent Application No. 10-2020-0103477, filed on Aug. 18, 2020, which is hereby incorporated by reference as if fully set forth herein.

BACKGROUND OF THE INVENTION

Field of the Invention

The present disclosure relates to a method of manufacturing cage for a constant velocity joint and a cage for a constant velocity joint manufactured using the same, and more particularly, to a method of manufacturing cage for a constant velocity joint and a cage for a constant velocity joint manufactured using the same for achieving uniform hardness and ductility of a core part as well as a surface of the cage.

Discussion of the Related Art

Korean Patent Publication No. 10-2007-0055423 and U.S. Pat. No. 7,758,431 disclose a quenching and tempering process for manufacturing a cage, and in the case of the process, because high carbon martensite, retained austenite, and a grain boundary oxide layer are distributed on a surface of a cage, and a core part (with a depth of 1 mm or more) is formed of low carbon martensite, there is a problem in that the surface has a high hardness but has low ductility and there is a high difference in a hardening degree between the surface and the core part, and the cage needs to be reheated for tempering after rapid cooling.

In addition, there is also a problem that the possibility of cracks or deformation due to quenching exists.

Japanese Patent Publication No. 4731945 discloses a carburizing process and a quenching-tempering process of low carbon steel cast for full hardening of a surface and a core part of a cage, but because high carbon martensite, retained austenite, and a grain boundary oxide layer are distributed on the surface of the cage, and the core part (with a depth of 1 mm or more) is formed of low carbon martensite, there is a problem in that the surface has a high hardness but has low ductility and there is a high difference in a hardening degree between the surface and the core part, and the cage needs to be reheated for tempering after rapid cooling. In addition, there is also a problem that the possibility of cracks or deformation due to quenching exists.

Korean Patent Nos. 10-0737602 and 10-0727196 disclose a method of manufacturing a cage using austempering. However, in the case of Korean Patent Nos. 10-0737602 and 10-0727196, because case hardening rather than full hardening is used, and low carbon steel (with carbon of 0.18 to 0.22 wt %) is used, a carburizing process and a diffusion process are required, and there is a problem in that the process time is increase accordingly. The structure of the surface is lower bainite, and the structure of the core part is tempered martensite, and accordingly, there is a problem in that the structures of the surface and the core part are not uniform and the core part and the surface have different strength or hardness.

SUMMARY OF THE INVENTION

An object of the present disclosure is to provide a method of manufacturing cage for a constant velocity joint and a cage for a constant velocity joint manufactured using the same for providing a cage having improved hardness, strength, and elongation while having a structure with a uniform core part and surface and for ensuring economic feasibility by reducing manufacturing time.

In accordance with an aspect of the present disclosure, the above and other objects can be accomplished by the provision of a method of manufacturing a cage for a constant velocity joint, including a cutting operation of forming a structure having an outer shape by cutting a cylindrical pipe, forming an outer circumference of the cut structure to have a curved surface thereon, performing a turning operation on a surface of the formed structure, a punching operation of forming a window in the surface of the structure on which the turning operation is performed, a broaching operation of processing an edge of the window formed via punching, and a heat treatment operation of fully hardening the completely broached cage via austempering.

A material of the cylindrical pipe used in the cutting operation may include medium carbon steel containing carbon of 0.3 to 0.5 wt % based on a total weight, manganese, or boron.

Total hardness of the cage may be in a range of HRC of 48 to 59 (HV of 500 to 650) through the heat treatment operation.

The heat treatment operation may include increasing temperature to 860 to 900° C. for 100 minutes to 140 minutes, after the increasing temperature is completed, uniformly heating the cage within a range of temperature of 860 to 900° C. for 80 minutes to 120 minutes, when the heating is competed, cooling the cage to 200 to 270° C., and when slow cooling is completed, performing austempering in a salt bath treatment tank in a range of temperature of 200 to 270° C.

The austempering may be performed in a methanol gas atmosphere.

BRIEF DESCRIPTION OF THE DRAWINGS

The accompanying drawings, which are included to provide a further understanding of the present disclosure and are incorporated in and constitute a part of this application, illustrate embodiment(s) of the present disclosure and together with the description serve to explain the principle of the present disclosure. In the drawings.

DETAILED DESCRIPTION OF THE INVENTION

Figure 1A:
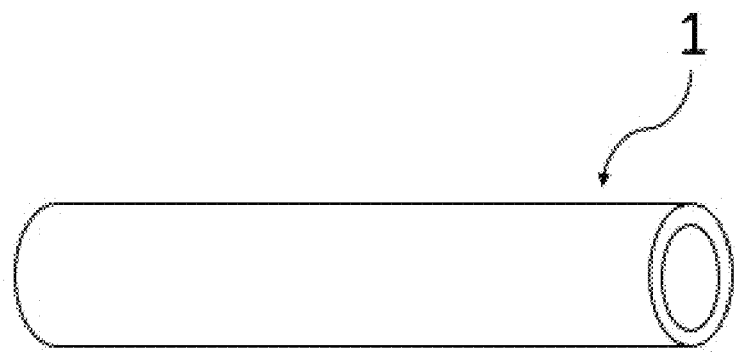
FIG. 1A is a perspective view of a pipe used to manufacture a cage according to the present disclosure.

The present disclosure may be variously changed and embodied in various forms, in which illustrative embodiments of the present disclosure are shown.

However, the present disclosure should not be construed as being limited to the embodiments set forth herein and any changes, equivalents, or alternatives which are within the spirit and scope of the present disclosure should be understood as falling within the scope of the present disclosure.

It will be understood that, although the terms first, second, third etc. may be used herein to describe various elements, these elements should not be limited by these terms.

These terms are only used to distinguish one element from another element.

For example, a first element may be termed a second element and a second element may be termed a first element without departing from the teachings of the present disclosure.

The term and/or is a combination of a plurality of related listed items or contains any of a plurality of related listed items.

It will be understood that when an element is referred to as being "connected to" or "coupled to" another element, it may be directly on, connected or coupled to the other element or intervening elements may be present.

In contrast, when an element is referred to as being "directly on," "directly connected to" or "directly coupled to" another element, there are no intervening elements or layers present.

The terms used in the present specification are used for explaining a specific exemplary embodiment, not limiting the present disclosure.

The singular expressions in the present specification include the plural expressions unless clearly specified otherwise in context.

The terms such as "include" or "comprise" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof.

Hereinafter, an embodiment will be described in detail with reference to the accompanying drawings, but the same or corresponding components are given the same reference numerals regardless of reference numerals, and redundant description thereof will be omitted.

Figure 1B:
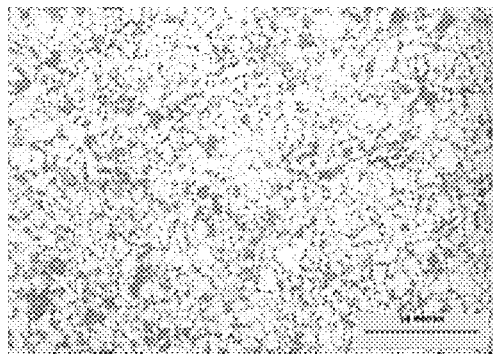
FIG. 1B is a photomicrograph of a structure of conventionally used low carbon steel.

FIGS. 1A and 1B show a cylindrical pipe 1 that is a raw material of a cage according to the present disclosure. The pipe 1 may be a seamless pipe manufactured through a drawing process. A conventionally used pipe is formed of low carbon alloy steel such as SCr415H or SAE8617H and has a structure with a large amount of ferrite and a small amount of pearlite, as shown in a photomicrograph of a structure shown in FIG. 1B. In the case of conventionally used low carbon steel, carburization and diffusion are easily performed, but a large amount of alloy needs to be contained, and thus there is a problem with the economic feasibility.

However, the present disclosure may advantageously apply medium carbon steel that is inexpensive and is stably supplied. In the case of medium carbon boron steel according to the present disclosure, the content of carbon may be 0.3 to 0.5 wt % based on the total weight, in detail, 0.45 to 0.5 wt %, the content of boron may be 0.0001 to 0.0005 wt %, and the content of manganese may be 0.5 to 0.6 wt %.

Selectively, in the above composition ratio, silicon of maximum of 0.01 to 0.1 wt %, phosphorus of 0.001 to 0.015 wt %, sulfur of 0.01 to 0.25 wt %, aluminum of 0.02 to 0.04 wt %, chromium of 0.2 to 0.3 wt %, molybdenum of 0.001 to 0.01 wt %, nickel of 0.01 to 0.025 wt %, copper of 0.01 to 0.015 wt %, titanium of 0.003 to 0.005 wt %, and nitrogen of 0.01 to 0.012 wt % may be added.

Medium carbon steel having carbon of 0.3 to 0.5 wt %, in detail, 0.45 to 0.5 wt % based on the total weight may be used, and thus a separate carburizing process and diffusion process are not necessary.

Figure 1C:
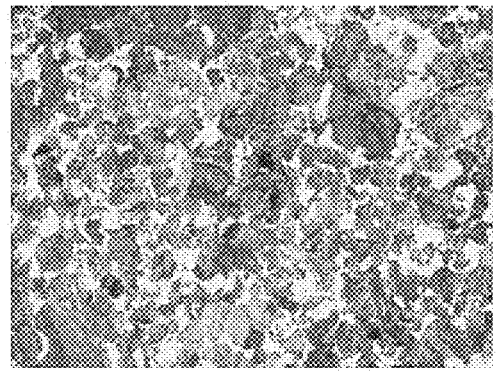
FIG. 1C is a photomicrograph of a structure of medium carbon steel according to the present disclosure.

As shown in FIG. 1C, the structure of the medium carbon steel according to the present disclosure may have a small amount of ferrite and a large amount of pearlite.

Figure 2A:
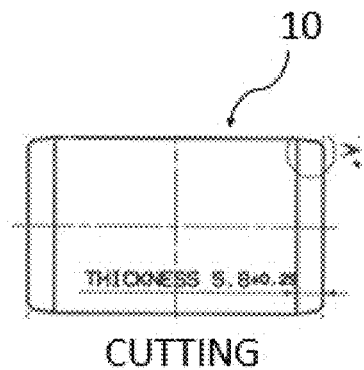
FIGS. 2A to 2E are diagrams showing a process of processing a cage according to the present disclosure.

As shown in FIG. 2A, a structure 10 constituting an outer shape of a cage may be manufactured by cutting the cylindrical pipe in a longitudinal direction.

Figure 2B:
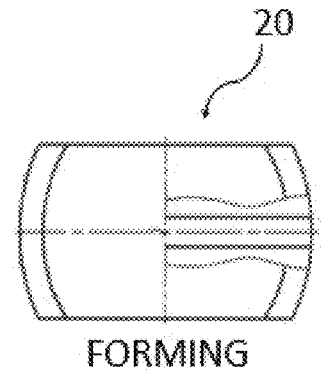
Figure 2C:
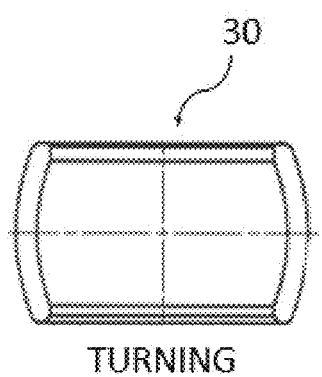

As shown in FIG. 2B, a forming operation for forming a structure 20 with a curved surface on an outer circumference thereof may be performed, and as shown in FIG. 2C, a turning process of forming a chamfer, a flat surface, or a curved surface by removing a sharp edge portion from a surface of an edge of a structure 30 may be performed.

Figure 2D:
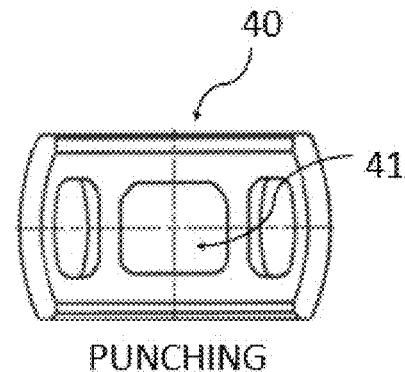
Figure 2E:
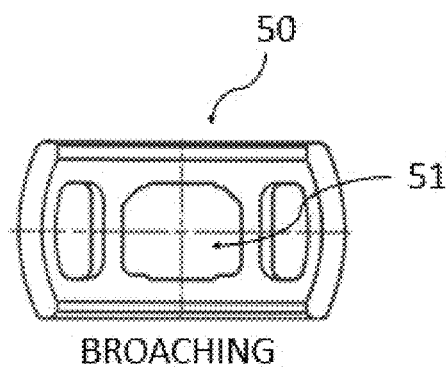

After the turning process is completed, a punching process of forming a window 41 for accommodating a ball on an outer circumference of a structure 40 may be performed, and a broaching process of processing an edge of a window 51 may be performed on a structure 50 on which punching is completed, as shown in FIG. 2D.

As such, after the broaching process is completed, heat treatment may be performed on the cage.

Conventionally, quenching and tempering for carburization are performed on low carbon steel (carburizing). Conventionally, the temperature is increased to 930° C. for about 120 minutes, and when the temperature reaches 930° C., the temperature state is maintained for about 5 minutes, and then a carburizing process is performed for 90 minutes and a diffusion process is performed for about 40 minutes.

Then, temperature drop is performed for 60 minutes to reach 860° C., and when the temperature is reached, a uniform heating process for uniformly maintaining the temperature may be performed.

After the uniform heating process is completed, a cage is put in a quenching bath containing coil, and a quenching process is performed for about 30 minutes, and in this case, the temperature of the oil in the quenching bath is 150° C.

After the quenching process is completed, a process of cleaning a surface of the cage using a specific detergent to remove the oil, and then a tempering process is performed for about 90 minutes.

Figure 3A:
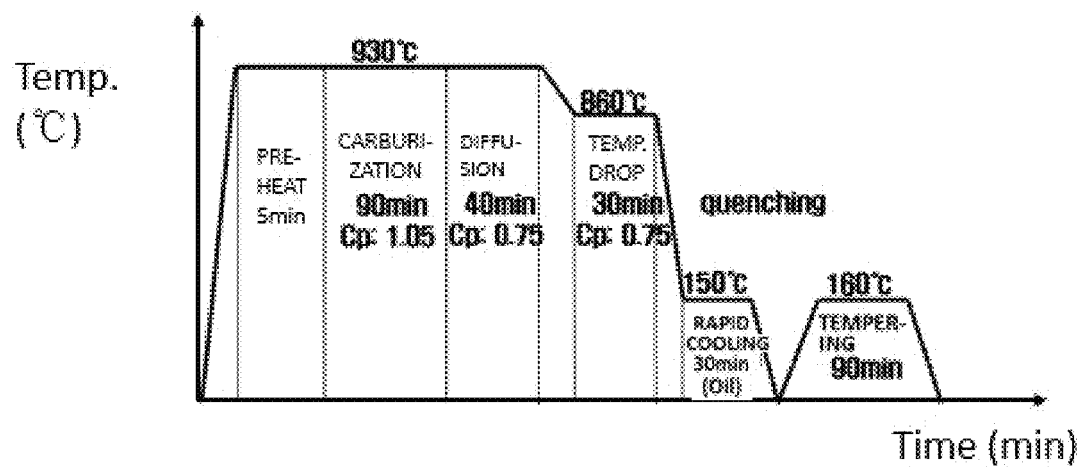
FIG. 3A is a graph showing time and temperature of a conventional heat treatment process.
Figure 3B:
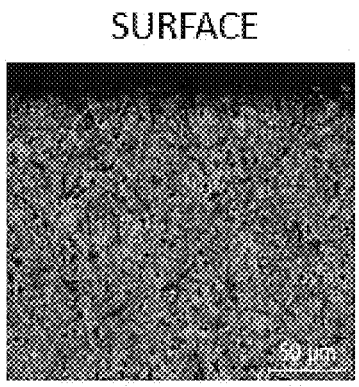
FIG. 3B is a photomicrograph of a structure of a surface of a conventional cage.
Figure 3C:
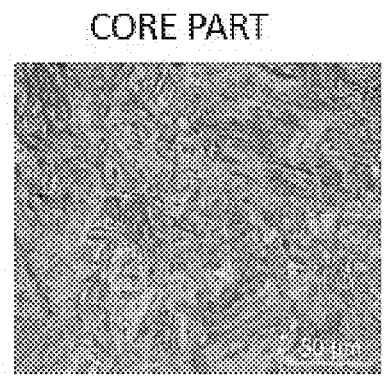
FIG. 3C is a photomicrograph of a structure of a core part of a conventional cage.

As such, conventionally, when heat treatment is performed, the surface of the cage includes high carbon martensite, remained austenite, and a grain boundary oxide layer, as shown in an image of FIG. 3B, and the core part of the cage includes low carbon martensite and other components (e.g., bainite), as shown in an image of FIG. 3C. As such, a difference in a particle state between the surface and the core part causes a difference in strength and ductility between the surface and the core part.

The conventional heat treatment method has a problem in that there is a problem with a difference in strength and ductility between the surface and the core part, as described above, and a relatively long time is consumed. A heat treatment process according to the present disclosure for overcoming the problem may be performed for full hardening, and to this end, an austempering process is further performed.

In the heat treatment process according to the present disclosure, the temperature may be increased to 860 to 900° C. (in detail, 880° C.) for 100 minutes to 140 minutes (in detail, 120 minutes), and then, after temperature rise is completed, the cage may be uniformly heated in a range of temperature of 860 to 900° C. (in detail, 880° C.) for 80 minutes to 160 minutes (in detail, 90 minutes).

Then, after a heating process is completed, the temperature is lowered to 200 to 270° C. (in detail, 230° C.), and after cooling is completed, austempering may be performed in a salt bath treatment tank in a range of temperature of 200 to 270° C. (in detail, 230° C.) for 130 to 170 minutes (in detail, 150 minutes).

Figure 5:
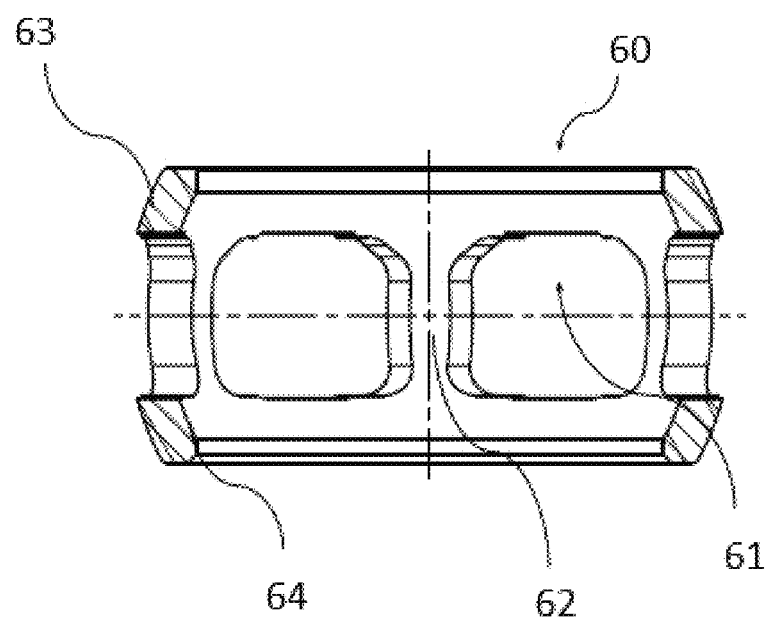
FIG. 5 is a diagram of a cage of a ground surface after a heat treatment process according to the present disclosure.

When cooling is completed after the heat treatment process, a grinding operation may be performed on a window 61, an inner diameter surface 64, and an outer diameter surface 63 in order to remove fine small elements that interfere with an object (a ball, an inner ring, or an outer ring) in a constant velocity joint and to smooth the surface, as shown in FIG. 5.

Figure 4A:
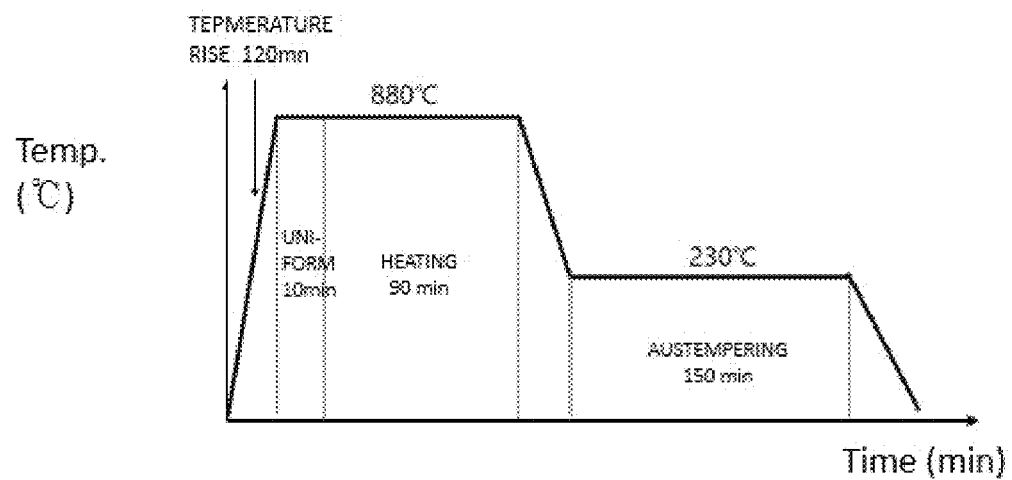
FIG. 4A is a graph showing time and temperature of a heat treatment process according to the present disclosure.
Figure 4B:
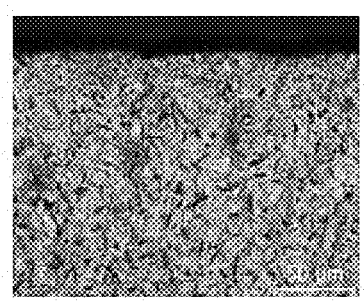
FIG. 4B is a photomicrograph of a structure of a surface of a cage according to the present disclosure.
Figure 4C:
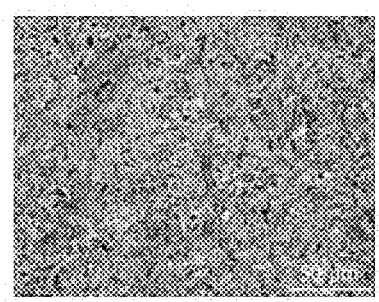
FIG. 4C is a photomicrograph of a structure of a core part of a cage according to the present disclosure.

When the heat treatment is performed, as seen from a photomicrograph of a surface of a cage shown in FIG. 4B and a photomicrograph of a core part of a cage shown in FIG. 4C, both of the surface and the core part may be lower bainite, and that is, may be in the same state, and thereby, uniform full hardening is achieved for the entire cage.

Figure 6A:
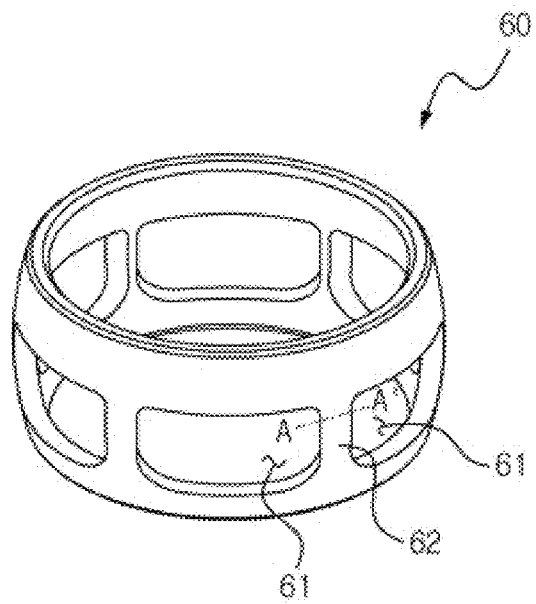
FIG. 6A is an image of a cage.
Figure 6B:
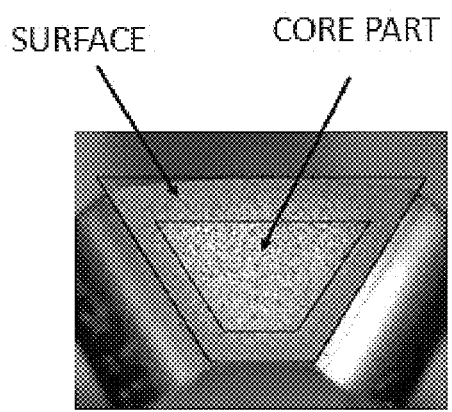
FIG. 6B is an image of a cutting portion of a web part of a cage manufactured using a conventional method, taken from line A-A' of FIG. 6A.
Figure 6C:
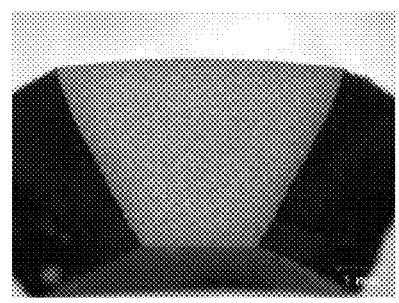
FIG. 6C is an image of a cutting portion of a web part of a cage manufactured using a method according to the present disclosure, taken from line A-A' of FIG. 6A.

As seen from FIGS. 6A to 6C, full hardening is also achieved, and in this case, as seen from FIG. 6A, when a middle of a web part between windows is cut (a dotted line), if a quenching and tempering (Q/T) process is performed on low carbon steel like the prior art, the surface is carburized with relatively dark gray, but the core part (a central part) is indicated by light gray or white and carburization is rarely performed.

That is, it is visually seen that that there is a significant difference in a carburization degree between the surface and the core part, and thus, there is a significant difference in strength or elongation between the surface and the core part.

That is, in the case of the surface, high carbon martensite, remained austenite, and a grain boundary oxide layer are distributed as shown in the photomicrograph of FIG. 3B, and in the case of the core part, low carbon martensite and bainite components are distributed as shown in the photomicrograph of FIG. 3C, and accordingly, there is a clear difference in the overall color and arrangement of particles.

On the other hand, according to the present disclosure, the color and particles of the surface and the core part may have uniform states by applying austempering to medium carbon steel. That is, as shown in FIGS. 4B and 4C, both of the surface and the core part may formed of lower bainite, and thus the uniform state of color and particle arrangement may be achieved.

According to the present disclosure, quenching and tempering are omitted, and thus it may be advantageous in that heat treatment prevents deformation or cracks due to metal cooling during a quenching process and remarkably reduces time required for the process, and a grain boundary oxide layer is not formed, thereby improving strength of a cage compared with the prior art.

Figure 7A:
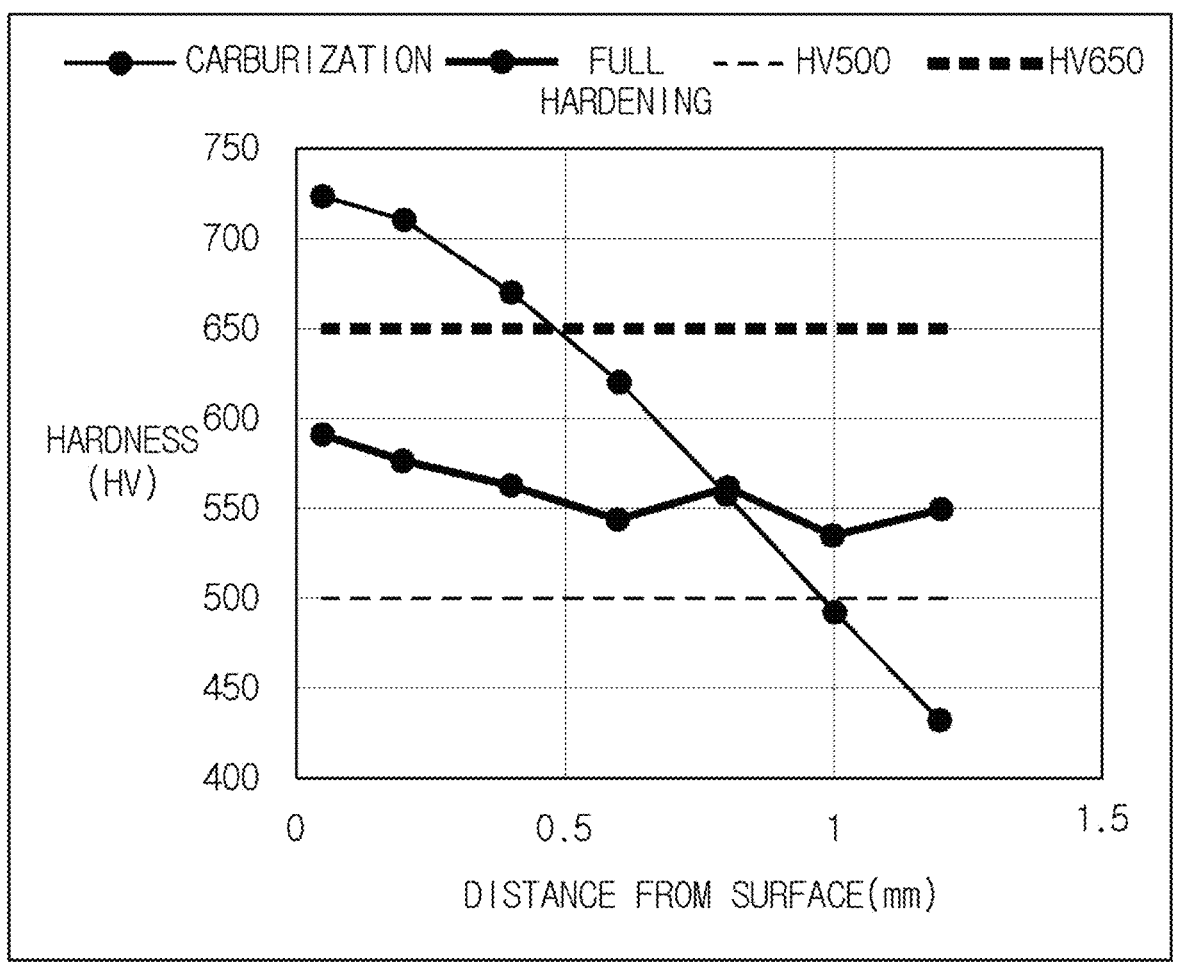
FIG. 7A is a graph showing comparison in hardness between carburizing as the prior art and full hardening according to the present disclosure.
Figure 7B:
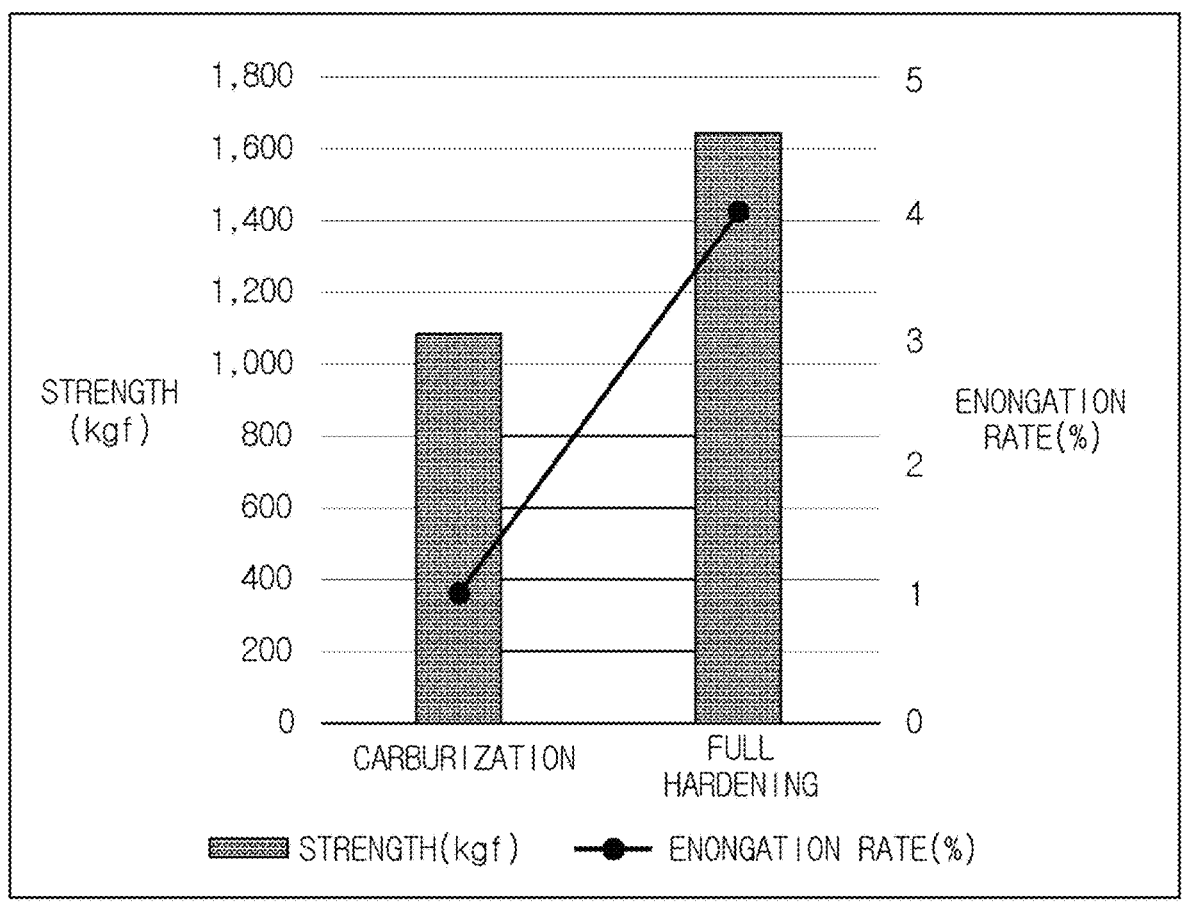
FIG. 7B is a graph showing comparison in tensile strength and elongation between carburizing as the prior art and full hardening according to the present disclosure.

FIG. 7A is a graph showing comparison between a hardness curve (thin line) of a conventional cage manufactured using a carburizing process and a hardness curve (thick line) of a cage according to the present disclosure manufactured using a full hardening process.

Here, the standard hardness of the cage needs to be in the range of 500 to 650 HV (HRC 48 to 59). However, conventionally, the hardness of the surface is 700 to 750 Hv, but the hardness is rapidly degraded towards the core part, and thus the hardness at a point deeper than 1 mm from the surface may be about 400 to 450 Hv and a difference in hardness between the surface and the core part may be significant. That is, the difference ratio in the hardness between the surface and the core part may be about 40% (which is calculated when the hardness of the surface is 725 Hv and the hardness of the core part at a depth of 1.2 mm is 425 Hv).

On the other hand, according to the present disclosure, the hardness of the surface is about 600 Hv, and the hardness of the core part at a depth of 1 mm or more is 530 to 550 Hv, and thus, a maximum difference ratio therebetween is equal to or less than 10% (which is calculated when the hardness of the surface is 590 Hv and the hardness of the core part at a depth of 1 mm (the core part at a depth of 1 mm has the lowest hardness)).

Accordingly, it may be seen that, according to the present disclosure, a difference in hardness between the surface and the core part is very small compared with the prior art, and also satisfies the standard hardness.

In the case of tensile strength (bar graph) of a tensile test (stretch test), as seen from 7B, conventional tensile strength is 1100 kgf, but tensile strength according to the present disclosure is slightly larger than 1600 kgf, and accordingly, the tensile strength according to the present disclosure may be improved by 45% or more over the prior art.

In the case of elongation (line graph) of a tensile test, it may be seen that conventional elongation is about 1%, but elongation according to the present disclosure is larger than about 4%, and accordingly, the elongation according to the present disclosure may be improved by 300% or more over the prior art.

Figure 8A:
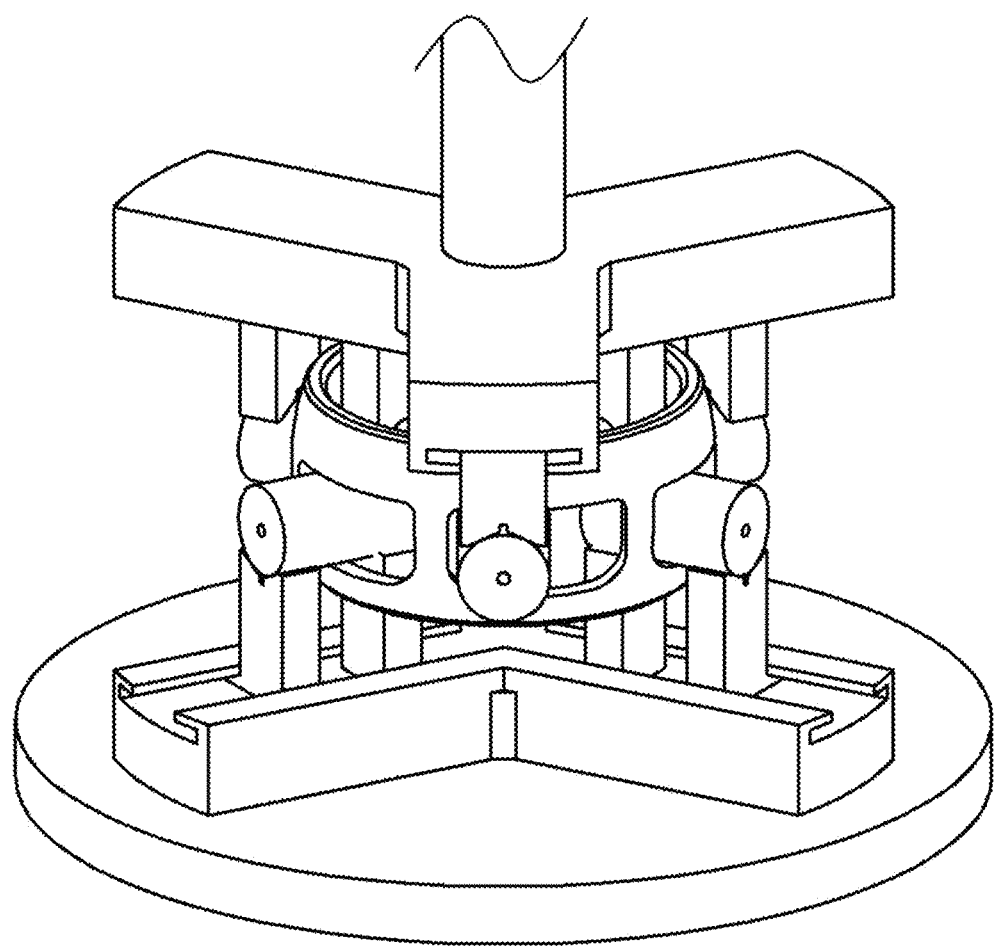
FIG. 8A is an image showing a state in which a cage is installed in a device for measuring compressive strength.
Figure 8B:
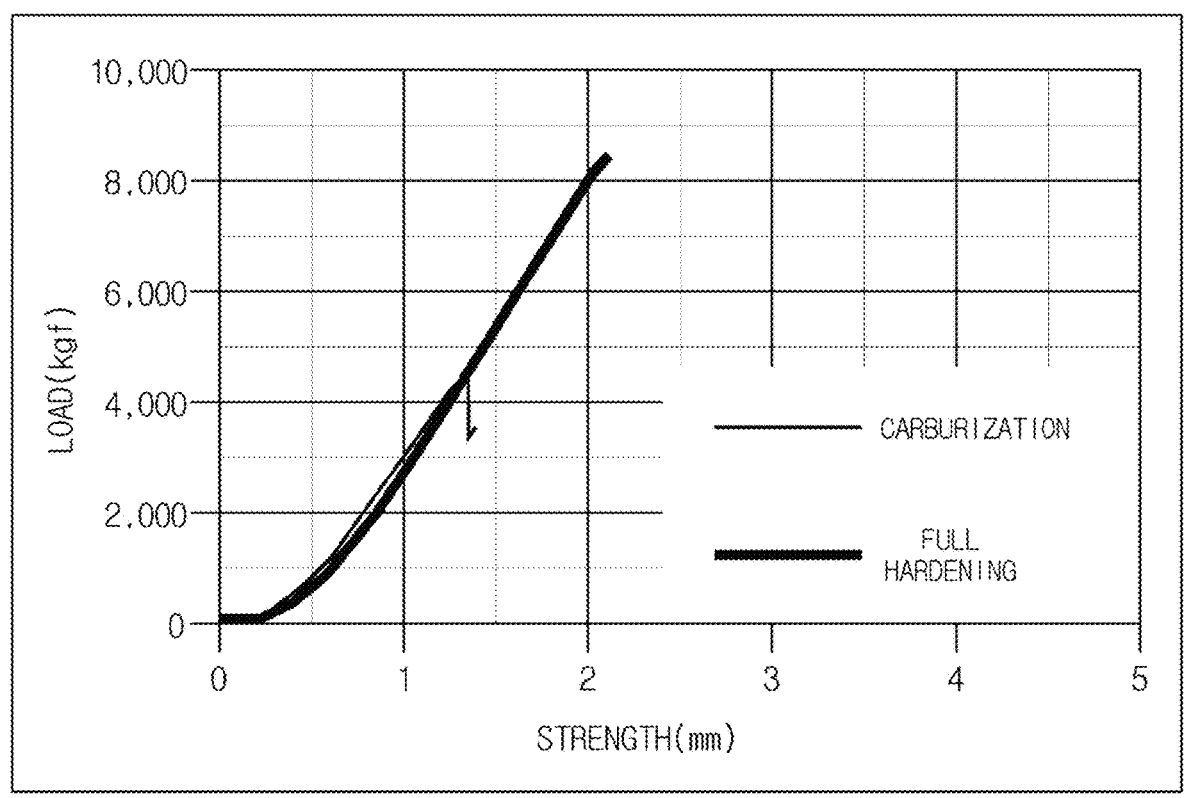
FIG. 8B is a graph showing comparison in compressive strength between carburizing as the prior art and full hardening according to the present disclosure.

FIG. 8A shows a drawing of a device for measuring strength (compressive strength) of a cage. A short rod-shaped rod may be installed on a window of the cage, jigs may be installed above and below the cage, and a support with a V-groove to support the rod may be installed on the top and bottom jigs. In this state, the device may measure the strength of the cage by applying force to the top jig downwards.

Conventionally, the cage withstands until a pressing force up to about 4800 kgf is supplied thereto, stretches to about 2.0 mm, and is torn when the force exceeds 4800 kgf. In contrast, according to the present disclosure, the cage withstands until a pressing force up to about 7900 kgf, stretches to about 3.8 mm, and is torn when the force exceeds 7900 kgf.

In this respect, it may be seen that the compressive strength and elongation according to the present disclosure is improved by about 1.6 times or more compared to the prior art.

Figure 9:
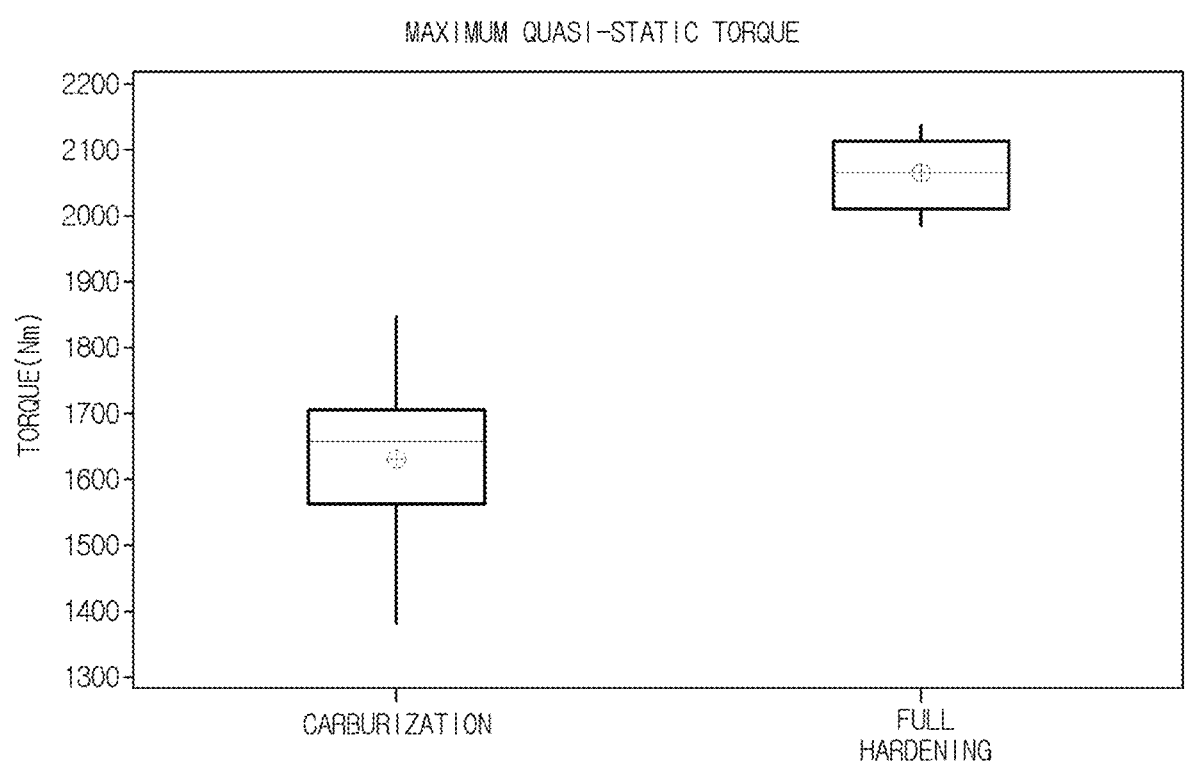
FIG. 9 is a graph showing measurement test results of maximum quasi-static torque when a cage is installed in a joint assembly according to the prior art and the present disclosure.

As shown in FIG. 9, a constant velocity joint assembly including a cage according to the present disclosure (full hardening) may have maximum quasi-static torque transferred at an inclination angle of 43.5°, which improved by about 1.2 to 1.25 times compared to a constant velocity joint assembly including a cage manufactured using the prior art (carburizing).

The cage manufactured using the prior art has a maximum quasi-static torque of about 1550 to 1700 Nm, and the cage according to the present disclosure may have a maximum quasi-static torque of 2000 to 2100 Nm.

Here, the maximum quasi-static torque is measured when an accelerator is fully depressed while a steering wheel is turned to the maximum in a vehicle.

When the heat treatment process according to the present disclosure is performed, methanol gas may be used as atmosphere gas. Conventionally, the cage is heated in an Rx gas atmosphere to prevent decarburization, but nevertheless, decarburization slightly occurs and the hardness of the surface is lower than that of the core part.

However, according to the present disclosure, a methanol gas atmosphere is used, and as a result of relatively weak carburization, the hardness of the surface is increased compared to the core part, thereby increasing the abrasion resistance of the surface.

Figure 10A:
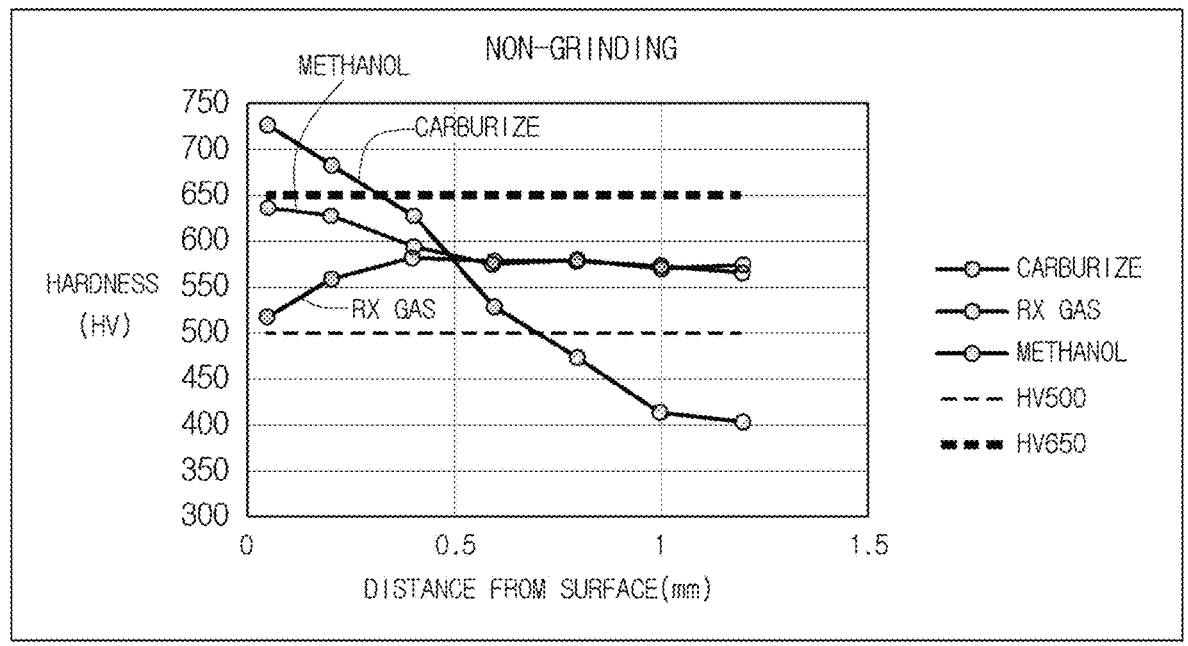
FIG. 10A is a graph showing comparison in hardness of a non-ground cage in the case in which Rx gas and methanol gas are used as atmosphere gas in a conventional carburizing process and a full hardening process.
Figure 10B:
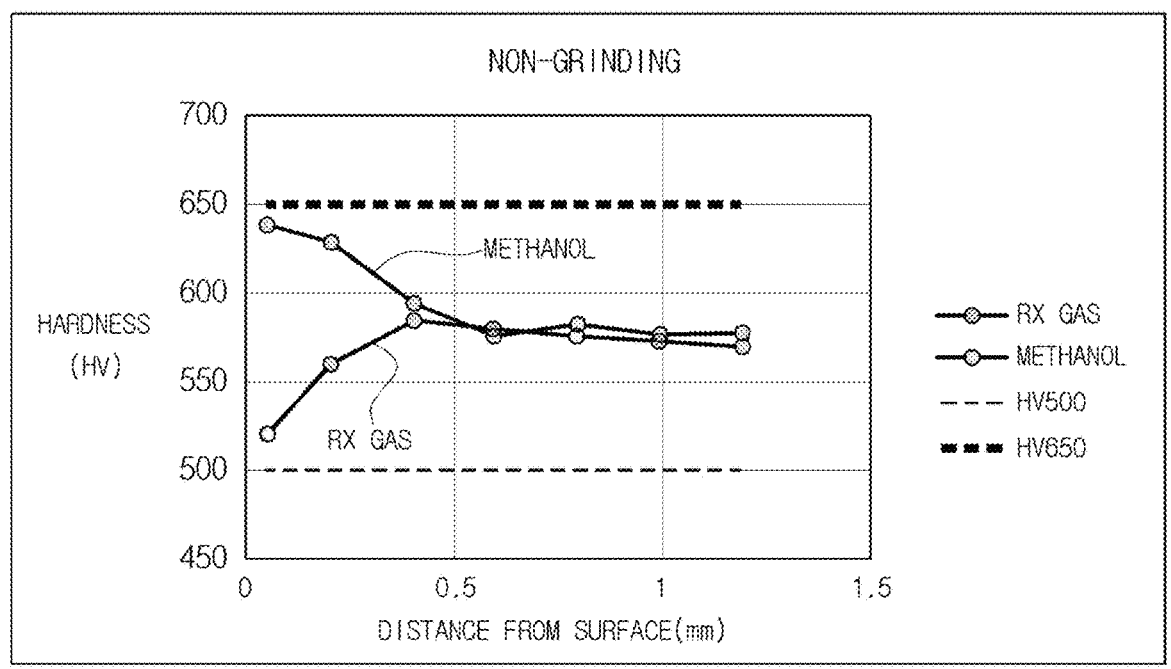
FIG. 10B is a graph showing comparison in hardness of a non-ground cage in the case in which Rx gas and methanol gas are used as atmosphere gas in a full hardening process.

FIGS. 10A and 10B show comparison of hardness in cases in which a final cage product is not ground. FIG. 10A is a graph showing comparison in a case in which atmosphere gas is not used according to the prior art ('Carburize' curve), a case in which Rx gas is used as atmosphere gas while an austempering process is performed ('Rx' curve), and a case in which methanol gas is used as atmosphere gas while an austempering process is performed ('Methanol' curve), that is, comparison in three cases, and FIG. 10B is a graph showing comparison in a case in which Rx gas is used as atmosphere gas ('Rx' curve) and a case in which methanol gas is used as atmosphere gas ('Methanol' curve), that is, comparison in two cases.

In the case of non-grinding, when the prior art is used without using atmosphere gas, the strength at a surface is 700 to 750 Hv and the strength at a core part with a depth of 1 mm or more is 400 to 450 Hv, as described above.

When Rx gas is used as atmosphere gas while an austempering method is used, the hardness of the surface is rather degraded (the hardness of the surface hardness being 510 to 530 Hv), and the hardness of the core part (with a depth of 1 mm or more) is 570 to 590 Hv. In contrast, according to the present disclosure, when methanol gas is used as atmosphere gas, the hardness of the surface hardness may be 630 to 640 Hv and the hardness of the core part (with a depth of 1 mm or more) may be 570 to 590 Hv, and it may be seen that the hardness of the surface is about 20 to 23% higher than in the case in which Rx gas is used, which means that decarburization slightly occurs during a heat treatment process when Rx gas is used, thus degrading the hardness of the surface.

Grinding may include a process of cutting the surface. Thus, the hardness of a ground surface of a cage may be slightly different from the hardness of a non-ground surface of a cage.

Figure 11A:
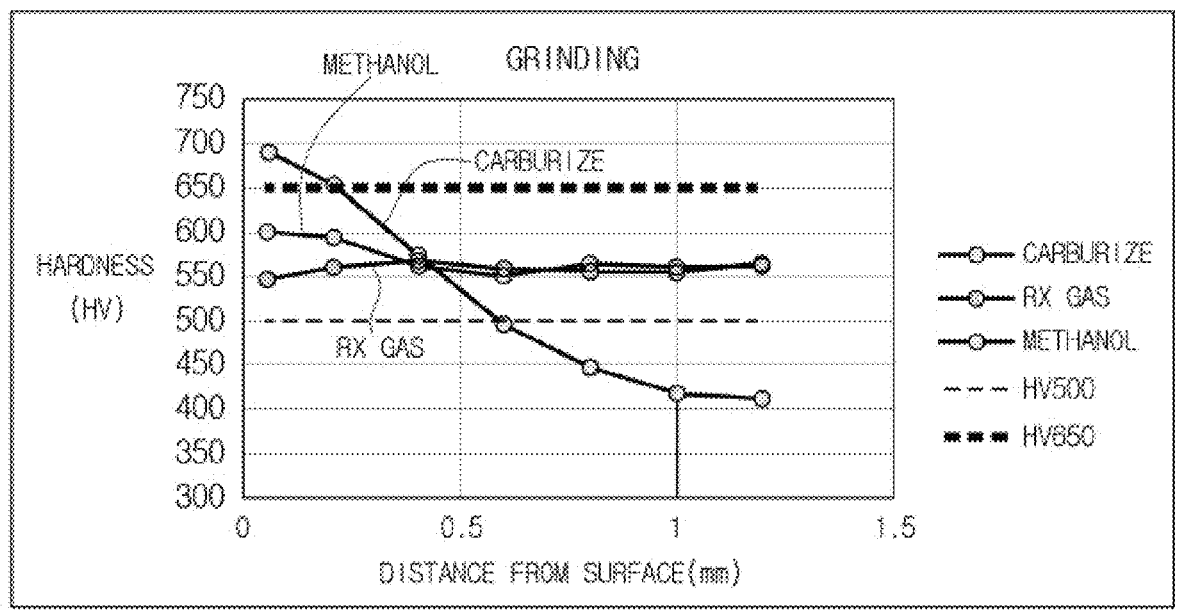
FIG. 11A is a graph showing comparison in hardness of a ground cage in the case in which Rx gas and methanol gas are used as atmosphere gas in a conventional carburizing process and a full hardening process.
Figure 11B:
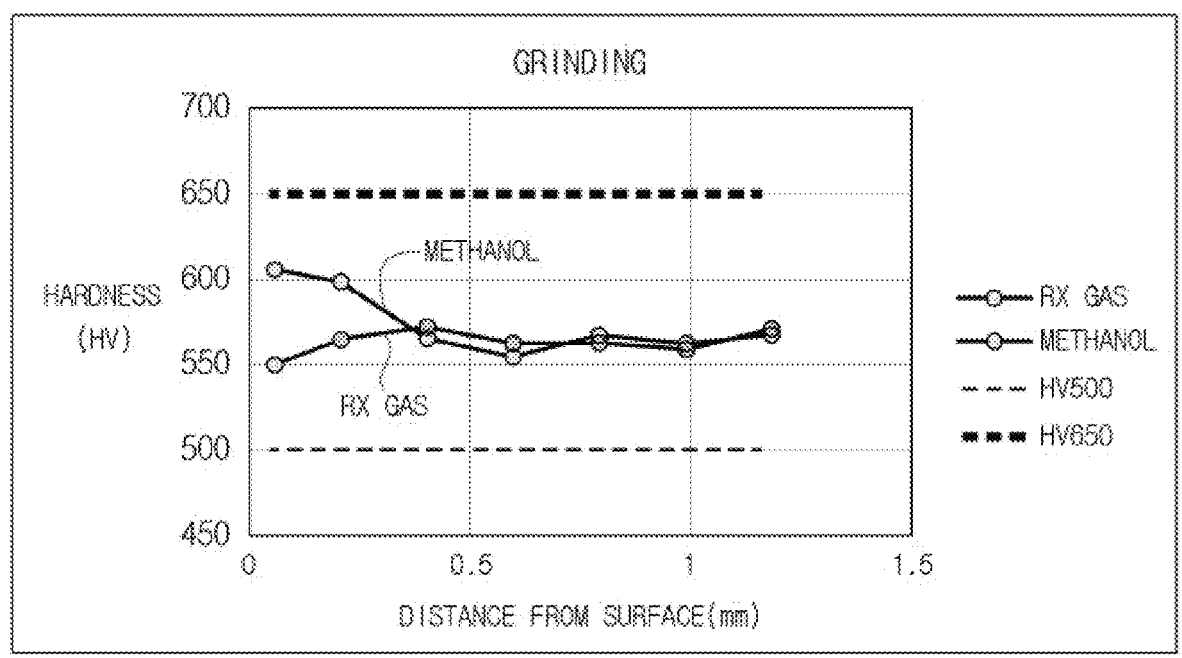
FIG. 11B is a graph showing comparison in hardness of a ground cage in the case in which Rx gas and methanol gas are used as atmosphere gas in a full hardening process.

That is, in the case of grinding, FIG. 11A is a graph showing comparison in a case in which atmosphere gas is not used according to the prior art ('Carburize' curve), a case in which Rx gas is used as atmosphere gas while an austempering process is performed ('Rx' curve), and a case in which methanol gas is used as atmosphere gas while an austempering process is performed ('Methanol' curve), that is, comparison in three cases, and FIG. 11B is a graph showing comparison in a case in which Rx gas is used as atmosphere gas ('Rx' curve) and a case in which methanol gas is used as atmosphere gas ('Methanol' curve), that is, comparison in two cases.

In the case of grinding, when the prior art is used without using atmosphere gas, the strength at a surface is 700 Hv and the strength at a core part with a depth of 1 mm or more is 400 to 450 Hv, as described above.

When Rx gas is used as atmosphere gas while an austempering method is used, the hardness of the surface may be 540 to 560 Hv which is slightly higher than the harness of the surface in the case of non-grinding, and the hardness of the core part (with a depth of 1 mm or more) may be 570 to 590 Hv.

In contrast, when Rx is used as atmosphere gas like in the present disclosure, the hardness of the surface may be 590 to 610 Hv which is lightly lower than the harness of the surface in the case of non-grinding, and the hardness of the core part (with a depth of 1 mm or more) may be 570 to 590 Hv, it may be seen that the hardness of the surface is about 8 to 9% higher than in the case in which Rx gas is used, which means that decarburization slightly occurs during a heat treatment process when Rx gas is used, thus degrading the hardness of the surface, like in the case of non-grinding.

Figure 12A:
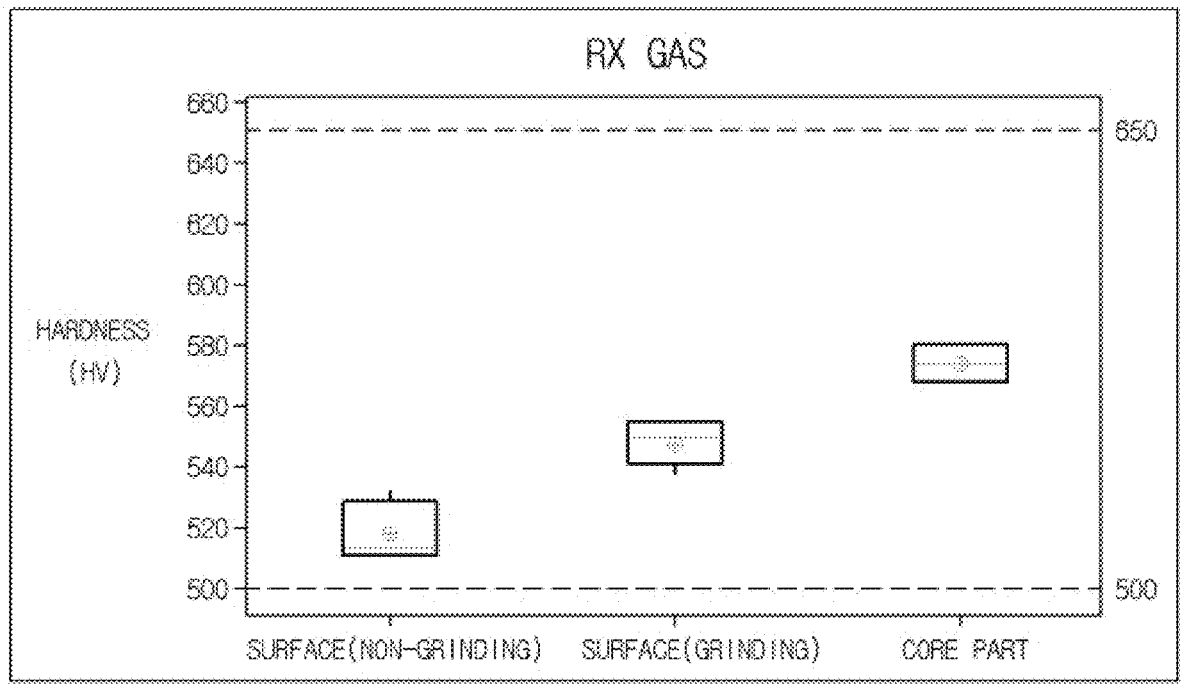
FIG. 12A is a graph showing the hardness of a non-ground surface, a ground surface, and a core part when Rx gas is used.
Figure 12B:
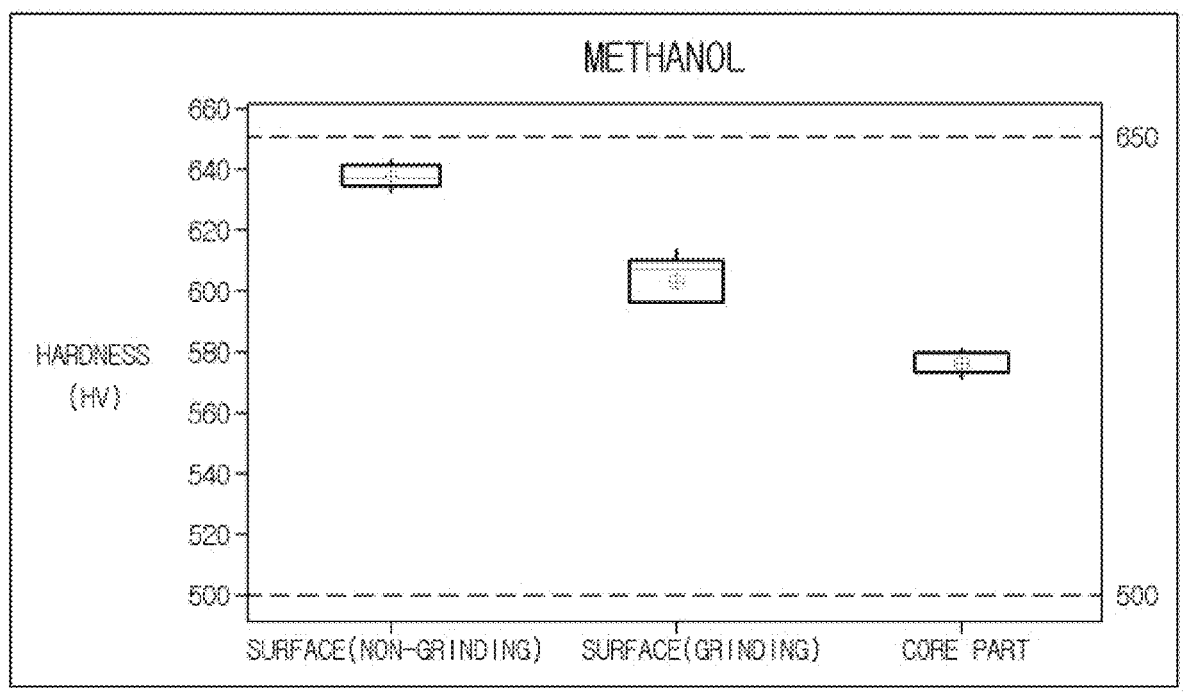
FIG. 12B is a graph showing the hardness of a non-ground surface, a ground surface, and a core part when methanol gas is used.

FIGS. 12A and 12B are graphs showing a result obtained via comparison using a different method in the hardness of a cage between a case in which Rx gas is used and a case in which methanol gas is used.

As shown in FIG. 12A, when RX gas is used, the hardness of a non-ground surface of a cage is about 510 to 530 Hv, the hardness of a ground surface of a cage is about 540 to 560 Hv, and the hardness of a core part is 570 to 590 Hv.

In contrast, as shown in FIG. 12B, when methanol gas is used, the hardness of a non-ground surface of a cage is about 630 to 640 Hv, the hardness of a ground surface of a cage is about 590 to 610 Hv, and the hardness of a core part is 570 to 590 Hv.

Compared with the conventional method (quenching and tempering are performed while a carburizing method is performed on low carbon steel), the present disclosure use medium carbon steel and the austempering process and thus may be advantageous in that hardness is enhanced, and tensile strength, compressive strength, and elongation are remarkably improved while remarkably reducing time required for the process, thereby providing a cage with excellent durability.

Since a quenching process is omitted, it may be advantageous in that deformation and cracks due to quenching are prevented and a grain boundary oxide layer at the surface is not generated.

In addition, the particle shape and hardened structure of the surface and the core part may be uniform, and thus the hardness of the surface and the hardness of the core part may advantageously have a uniform value within a specific range (500 to 650 Hv).

According to the present disclosure, it may be possible to prevent a decarburization phenomenon in which carbon disappears from the surface of the cage during a heat treatment process using methanol gas as atmosphere gas. Accordingly, the hardness of the surface may be advantageously prevented from being degraded.

As described above, the present disclosure has been described with reference to the embodiments shown in the drawings, but this is only for explaining the invention, and those of ordinary skill in the art to which the present disclosure pertains from the detailed description of the invention will be appreciated that modifications or equivalent embodiments are possible.

Therefore, the scope of the present disclosure should be defined by the technical spirit of the claims.

What is claimed is:

1. A method of manufacturing a cage for a constant velocity joint, the method comprising:
a cutting operation of forming a structure having an outer shape by cutting a cylindrical pipe;
forming an outer circumference of the cut structure to have a curved surface thereon;
performing a turning operation on a surface of the formed structure;
a punching operation of forming a window in the surface of the structure on which the turning operation is performed;
a broaching operation of processing an edge of the window formed via punching; and
a heat treatment operation of performing a heat treatment to the broached cage,
wherein the heat treatment operation includes:
increasing a temperature of the cage to 880° C. for 100 to 140 minutes;
maintaining the temperature of the cage at 880° C. for 80 to 150 minutes;
cooling the cage to 200 to 270° C.; and
when the slow cooling is completed, performing austempering in a salt bath treatment tank in a range of 200 to 270° C. for 130 to 170 minutes.

2. The method of claim 1, wherein a material of the cylindrical pipe used in the cutting operation includes medium carbon steel containing 0.3 to 0.5 wt % carbon, 0.5 to 0.6 wt % manganese, and 0.0001 to 0.0005 wt % boron.

3. The method of claim 1, wherein a total hardness of the cage is in a range of HRC of 48 to 59 (HV of 500 to 650) through the heat treatment operation.

4. The method of claim 1, wherein the austempering is performed in a methanol gas atmosphere.

5. A cage for a constant velocity joint manufactured using the method of claim 1.

* * * * *